(12) United States Patent
Horikoshi et al.

(10) Patent No.: US 6,636,550 B1
(45) Date of Patent: Oct. 21, 2003

(54) BI-DIRECTIONAL TRANSMITTER/ RECEIVER SYSTEM AND BI-DIRECTIONAL TRANSMITTER/RECEIVER

(75) Inventors: Katsu Horikoshi, Gunma-Ken (JP); Hisayoshi Uchiyama, Gunma-Ken (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/218,673

(22) Filed: Dec. 22, 1998

(30) Foreign Application Priority Data

Dec. 26, 1997 (JP) .............................. 9-359751

(51) Int. Cl.[7] ................................. H04B 1/69
(52) U.S. Cl. .................... 375/130; 375/132; 375/133; 375/152; 375/259; 370/311; 370/342
(58) Field of Search ................................. 375/130, 132, 375/152, 259, 295, 316, 133; 370/311, 335, 342, 347

(56) References Cited

U.S. PATENT DOCUMENTS

| | | | | |
|---|---|---|---|---|
| 5,260,944 A | * | 11/1993 | Tomabechi | 370/347 |
| 5,559,789 A | * | 9/1996 | Nakano et al. | 370/342 |
| 5,943,361 A | * | 8/1999 | Gilhousen et al. | 375/142 |
| 6,047,015 A | * | 4/2000 | Watanabe et al. | 375/132 |
| 6,226,274 B1 | * | 5/2001 | Reese et al. | 370/280 |

FOREIGN PATENT DOCUMENTS

JP 08265214 A 10/1996

* cited by examiner

*Primary Examiner*—Shuwang Liu
(74) *Attorney, Agent, or Firm*—Cantor Colburn LLP (57) ABSTRACT

To ensure establishment of synchronization and data demodulation among a number of transmitter/receivers using a spread spectrum method. Specifically, in a normal communication state, a second transmitter/receiver sends transmission data including a pilot carrier and a communication carrier. Receiving the transmission data, a first transmitter/receiver establishes synchronization between a spread code contained in the received spread spectrum signal and its own generated spread code, based on dummy data received during a pilot carrier period, and maintains the established synchronization. Thereafter, the first transmitter/receiver digitally demodulates data in the communication carrier. The resultant data is subjected to decoding and analog conversion to be converted into an audio signal. A control data is derived from the digitally demodulated data, and used to control the operation of the first transmitter/receiver. With this arrangement, synchronization is established between a received spread spectrum code and generated spread spectrum code, and then a communication carrier period starts. This makes it possible to ensure establishment of synchronization and data demodulation despite a longer time necessary for a receiver/transmitter employing a spread spectrum method to establish synchronization for spread spectrum codes.

6 Claims, 4 Drawing Sheets

BI-DIRECTIONAL TRANSMITTER/ RECEIVER SYSTEM AND BI-DIRECTIONAL TRANSMITTER/RECEIVER

BACKGROUND OF THE INVENTION

1. Field of the Invention

The present invention relates to a bi-directional transmitter/receiver for time division transmission of a signal in two ways between first and second transmitter/receivers, the signal being modulated using a spread spectrum method.

2. Description of the Related Art

Figure 1:
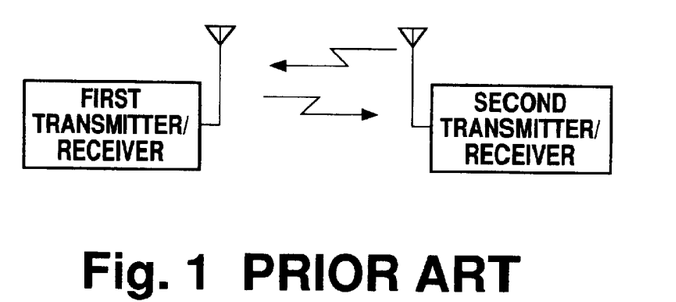
FIG. 1 is a block diagram illustrating the concept of bi-directional communication.

Generally, a bi-directional transmitter/receiver system for time division bi-directional communication has been known. Referring to FIG. 1, a first transmitter/receiver transmits signals to a second transmitter/receiver using a predetermined RF frequency during a predetermined period, and the second transmitter/receiver then transmits signals to the first transmitter/receiver using the same RF frequency during a predetermined period. This is refereed to as a Time Division Duplexer, or TDD, communication method. Communication between the first and second transmitter/receivers is made through repetitive time division transmissions between them. As one example of such communication systems, there is a system which employs a spread spectrum method as a modulation/demodulation method. On the transmitter side, for example, audio data or the like is subjected to spread spectrum modulation by using a spread code, and then frequency conversion into an RF frequency. On the receiver side, the received spread spectrum modulation signal is subjected to spread spectrum demodulation by using a spread code to obtain audio data or the like.

With the spread spectrum method, audio data or the like cannot be demodulated unless a spread code in the received spread spectrum modulation signal and a spread code generated by the receiver are synchronized with each other because demodulation cannot properly be achieved unless the two spread codes are synchronized. With this in mind, synchronization is ensured between the two spread signals by using a PLL method as disclosed in JPA Hei 8-265214.

To ensure synchronization of two spread codes on the receiver side, VCO oscillation frequencies for PLL are forcibly varied from higher to lower frequencies until synchronization is detected. When synchronization is detected forcible variation is halted. This is referred to as sliding correlation, which has an advantage of smaller power consumption. The sliding correlation, therefore, is advantageous in view of power consumption when at least one of the transmitter and the receiver of the transmission/receiving system shown in FIG. 1 is a portable phone (e.g., a handset of a cordless telephone device).

However, it takes time until two spread codes are synchronized when the sliding correlation in which oscillation frequencies of VCO are varied is used as it is not known when synchronization is established. As it is, all transmission data cannot be demodulated with only the employment of a sliding correlation device as time is largely consumed for establishment of synchronization within one receiving period. Therefore, a spread spectrum method using a sliding correlation device is not favorably used in a time division bi-directional communication system.

SUMMARY OF THE INVENTION

According to one aspect of the present invention (claim 1), there is provided a bidirectional transmission/receiving system for time division communicating a signal in two directions between first and second transmitter/receivers, the signal being modulated using a spread spectrum method. In this system, one of the first and second transmitter/receivers sending data includes a pilot carrier for making the other of the first and second transmitter/receivers establish synchronization for spread spectrum signals, and a communication carrier including an information data.

Also, in the above system, the pilot carrier is generated by carrying out spread spectrum on data with a predetermined pattern.

Further, in the above system, one of the first and second transmitter/receivers establishes synchronization for the spread spectrum signals based on the pilot carrier, and then demodulates the information data included in the communication carrier through spread spectrum.

Still further, in the above system, the first and second transmitter/receivers each establish synchronization between a received spread spectrum signal and its own generated spread signal through sliding correlation during a pilot carrier period.

According to another aspect of the present invention, there is provided a transmitter/receiver for time division communicating a signal in two directions with a paired transmitter/receiver, the signal being modulated in a spread spectrum method. This transmitter/receiver sends data to the other paired transmitter/receiver, the data including a pilot carrier for making the paired transmitter/receiver establish synchronization of a spread spectrum signal, and a communication carrier including information data.

Also, in the above transmitter/receiver, the pilot carrier is dummy data generated by giving spread spectrum to data with a predetermined pattern.

Further, when a spread spectrum signal is received from the other paired transmitter/receiver, the above transmitter/receiver establishes synchronization for a received spread spectrum signals based on the pilot carrier, and then demodulates the information data included in the communication carrier through despread spectrum.

According to the present invention, data for transmission includes a pilot carrier for use in establishment of spread spectrum signal synchronization, and a communication carrier including information data. With this arrangement, the transmission data can be accurately demodulated for reproduction with the spread spectrum signals well synchronized.

That is, the present invention can advantageously achieve favorable time division bi-directional communication even when a spread spectrum demodulator is used, which synchronizes received and self-generated spread codes through sliding correlation and thus takes time to establish the synchronization.

Still further, in the above system, the first and second transmitter/receivers shift from being in an initial synchronization state in which the first and second transmitter/receivers are not synchronized, to being in a normal receiving state in which the first and second transmitter/receivers communicate spread spectrum signals. The data which one of the first and second transmitter/receivers in the initial synchronization state and the normal receiving state sends to the other of the first and second transmitter/receivers includes the pilot carrier and the communication carrier. The pilot carrier is kept being sent in the initial synchronization state for a longer time than in the normal receiving state.

Still further, the transmitter/receiver shifts from being in an initial synchronization state in which the transmitter/ receiver is not synchronized with the paired transmitter/receiver, to being in a normal receiving state in which the transmitter/receiver communicates spread spectrum signals with the paired transmitter/receiver. The data which the transmitter/receiver sends to the other of the paired transmitter/receivers in the initial synchronization state and the normal receiving state includes the pilot carrier and the communication carrier. The pilot carrier is kept being sent in the initial synchronization state for a longer time than in the normal receiving state.

That is, it takes a longer time to establish synchronization in the initial synchronization state than in a normal receiving state because the first and second transmitter/receivers in the initial synchronization state are totally out of synchronization. Thus, a pilot carrier period is set longer in the initial synchronization state than in a normal receiving state so that the first and second transmitter/receiver which are not synchronized with each other at all can more reliably establish synchronization, and the following communication carrier can therefore be more accurately demodulated.

Further, in the above system, the first and second transmitter/receivers each have a number of channels usable for communication, and at least one of the first and second transmitter/receivers detects, through a search, an empty channel from among the number of channels while being in a data transmission/receiving mode so that the empty channel detected is used for data transmission/receiving.

When an empty channel is detected through a search, communication can automatically be made via an empty channel. Therefore, even when, for example, communications using different communication methods from the spread spectrum method are carried out in a frequency band where the communication using a spread spectrum method is carried out, the communication using a spread spectrum method is not hindered by the other communication so that data can be easily and accurately communicated between the first and second transmitter/receivers.

Still further, in the above system, one of the first and second transmitter/receivers starts counting a predetermined time upon starting sending data to the other of the first and second transmitter/receivers, and the other of the first and second transmitter/receivers starts counting a time of the same length upon starting to receive the data. The first and second transmitter/receivers both reverse transmission/receiving states after the predetermined time has elapsed.

When time periods of the same length are counted automatically at every start of data transmission/receiving so that data transmission/receiving states are reversed after the predetermined time period has elapsed, time can be easily and acurately managed among respective transmitter/receivers.

BRIEF DESCRIPTION OF THE DRAWINGS

The above and the other objects, features, and advantages of the present invention, will become further apparent from the following description of the preferred embodiment taken in conjunction with the accompanying drawings wherein.

DESCRIPTION OF THE PREFERRED EMBODIMENTS

Figure 2:
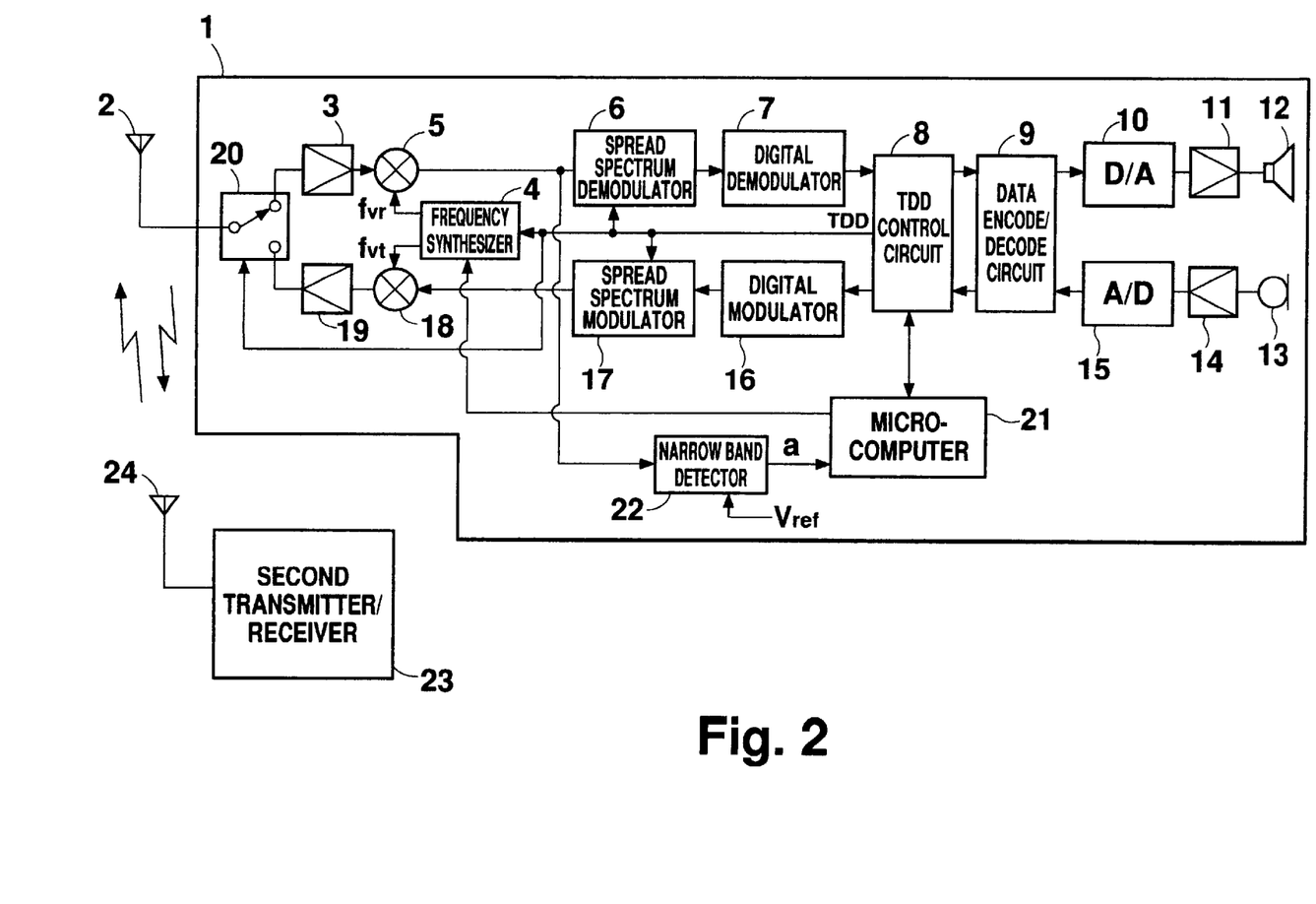
FIG. 2 is a block diagram showing a preferred embodiment of the present invention.

Referring to FIG. 2, a first transmitter/receiver 1 which employs a spread spectrum method is connected to a first antenna 2. An RF receiving amplifier 3 amplifies received RF signals received via the first antenna 2. A frequency synchronizer 4, constituted of a well known PLL, generates receiving and transmission local oscillation signals fvr and fvt according to a specific channel. A receiving mixer 5 converts a signal from the RF receiving amplifier 3 through frequency-conversion using a receiving local oscillation signal fvr into an IF signal. A spread spectrum demodulator 6, including a sliding correlation device, conducts spread spectrum demodulation using synchronized spread codes, and holds the established synchronization between the spread codes by using a circuit using a PLL method. Note that a sliding correlation device reproduces a spread code to acquire synchronization of a reproduced spread code with respect to a received spread code. A digital demodulator 7 conducts digital demodulation with respect to output data from the spread spectrum demodulator 6 through FSK (frequency shift keying) demodulation, PSK (phase shift keying) demodulation, or other demodulation methods. A TDD controller 8 controls such that the first transmitter/receiver device alternately receives and transmits data. The TDD controller 8 also receives demodulated data at the time of data receiving, and outputs data at the time of data transmitting as described later. A data encode/decode circuit 9 decodes demodulated data from the TDD controller 8 to output audio data, and encodes digitized input audio data to output to the TDD controller 8. A D/A converter 10 conducts analog conversion with respect to decoded audio data to output an output audio signal. An output audio amplifier 11 amplifies an output audio signal from the D/A converter 10 for driving a speaker 12.

An input audio amplifier 14 amplifies an input audio signal from a microphone 13. An A/D converter 15 carries out digital conversion with respect to an amplified input audio signal to output input audio data. A digital modulator 16 carries out digital modulation with respect to encoded data from the TDD controller 8 through FSK (frequency shift keying) modulation, PSK (phase shift keying) modulation, or other modulation methods. Note that the encoded data is obtained by the data encode/decode circuit 9 by digitally encoding the digitized input audio data supplied from the A/D converter 15 and introduced to the digital modulator 16 through the TDD controller 8. A spread spectrum modulator 17 carries out spread spectrum with respect to modulated data from the digital modulator 16 using a transmission spread code. A transmission mixer 18 converts a spread spectrum transmission signal through frequency-conversion using a transmission local oscillation signal fvt into a transmission RF signal. A transmission RF amplifier 19 amplifies a transmission RF signal. A switch 20 switches between introduction of a received RF signal received via the antenna 2 into the RF receiving amplifier 3 during a data receiving period, and introduction of a transmission RF signal into the antenna 2 during a data transmission period. A microcomputer 21 exchanges data with the TDD controller 8 and controls the TDD controller 8 and frequency synchronizer 4. A narrow band level detector 22 detects a signal level in a narrow band with a predetermined frequency at the middle of the band with respect to an output signal from the receiving mixer 5.

The first transmitter/receiver 1 switches between a data receiving mode and a data transmitting mode for every predetermined period according to a TDD method under control by the TDD controller 8. Specifically, according to a time division control signal TDD from the TDD controller 8, operation conditions of the frequency synchronizer 4, the spread spectrum demodulator 6, the spread spectrum modulator 17, and the switch 20 are switched accordingly.

During a data receiving period, in response to a control signal TDD, the frequency synchronizer 4 generates a receiving local oscillation signal fvr so as to turn on the demodulating operation of the spread spectrum demodulator 6 and turn off the modulating operation of the spread spectrum modulator 17. Also, the switch 20 is put into the state shown in FIG. 2. Under this condition, a received RF signal received via the antenna 2 is converted through frequency conversion into a received spread spectrum signal, which is then subjected to spread spectrum demodulation (despread spectrum) and digital demodulation to be converted into demodulated data. The resultant demodulated data is then subjected to data decoding and analog conversion to be converted into an audio signal. Also, control data is extracted from the demodulated data in the TDD controller 8, and supplied to the microcomputer 21.

On the other hand, during a data transmission period, in response to a control signal TDD, the frequency synchronizer 4 generates a transmission local oscillation signal fvr so as to turn off the spread spectrum demodulator 6 and turn on the spread spectrum modulator 17. Also, the switch 20 is made in the reversed state from that is shown in FIG. 2. Under this condition, input audio data is digitally-converted, and then encoded. The encoded data is subjected to digital modulation and spread spectrum modulation together with the control data supplied from the microcomputer 21. The resultant data is subjected to frequency conversion into a transmission RF signal, and then transmitted via the antenna 2.

Although paired transmitter/receivers alternately receive and transmit data for every predetermined period, respective circuits, such as from the D/A converter 10 to the first transmitter/receiver 12 and from the first transmitter/receiver 13 to the first transmitter/receiver 15, always operate irrespective of the alternating operation between data receiving and transmission.

A second transmitter/receiver 23 has an identical structure to that of the first transmitter/receiver 1. The first transmitter/receiver 1 and the second transmitter/receiver 23 make a pair for carrying out data transmission/receiving via the antenna 2 and 24, respectively. While the first transmitter/receiver 1 is sending data, the second transmitter/receiver 23 is in a data receiving mode. On the contrary, while the second transmitter/receiver 23 is sending data, the first transmitter/receiver 1 is in a data receiving mode. These situations are alternately switched so that data is transmitted or received.

Figure 3:
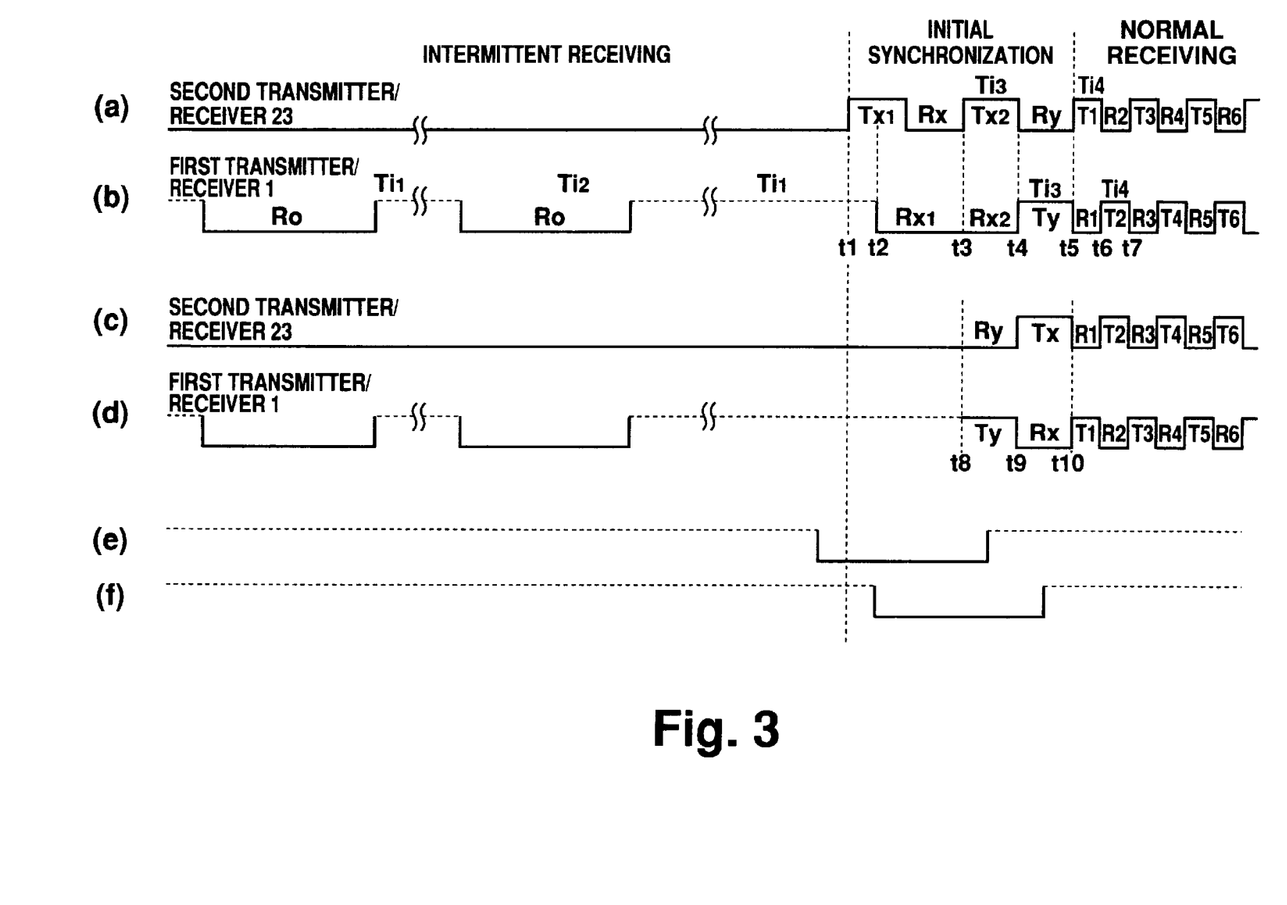
FIG. 3 is a timing chart for explaining the operation of the circuit shown in FIG. 2.

Referring to the timing chart of FIG. 3, "an intermittent receiving state", "an initial synchronization state (an initial stage where synchronization for spread codes are established on the receiver side)", and "a normal receiving state" between the first and second transmitter/receivers 1 and 23 will be described. In the following, the first transmitter/receiver 1 is, e.g., a handset of a cordless telephone device, and the second transmitter/receiver 23 is an extension telephone. FIGS. 3(*a*) and 3(*c*) show the operation of the second transmitter/receiver 23, while FIGS. 3(*b*) and 3(*d*) show the operation of the first transmitter/receiver 1.

"An intermittent receiving state" will be initially described.

In the intermittent receiving state, the second transmitter/receiver 23 is always in a data awaiting mode, as shown in FIG. 3(*a*), and the first transmitter/receiver 1 is put into a data awaiting mode every few seconds, as shown in FIG. 3(*b*). The microcomputer 21 of the first transmitter/receiver 1 counts time Ti1 (a few seconds) using a built-in timer. With the time Ti1 passed, the microcomputer 21 controls the TDD controller 8 such that the first transmitter/receiver 1 is put in a data receiving mode. Specifically, the TDD controller 8 generates a time division control signal TDD, upon which the frequency synchronizer 4 generates a receiving local oscillation signal fvr to activate the demodulation operation of the spread spectrum demodulator 6 and to make the switch 20 be in the state shown in FIG. 2. With the above, the first transmitter/receiver 1 is put in a data receiving mode R0. The TDD controller 8 then similarly counts time Ti2 from the start of the data receiving mode R0 so that the first transmitter/receiver 1 stays in a data awaiting mode during the time Ti2. The first transmitter/receiver 1 in a data awaiting mode can always receive data sent from the second transmitter/receiver 23. When time Ti2 is over, the first transmitter/receiver 1 is no longer in the data awaiting mode. The microcomputer 21 is then activated to count time Ti1 again.

While counting time Ti1, the microcomputer 21 carries out control such that operations of all circuits other than the microcomputer 21 are turned off. After time Ti1 has elapsed, the first transmitter/receiver 1 is put in a data receiving mode again. The above intermittent data receiving contributes to reduction of power consumption. Note that a data awaiting time Ti2 is set longer than a transmission/receiving time in an initial synchronization state, as described later, so that transmitted data can be reliably received.

"Initial synchronization state" will next be described taking as an example a case where the second transmitter/receiver sends initial transmission data to the first transmitter/receiver 1.

While the first transmitter/receiver 1 is in an intermittent receiving state, the second transmitter/receiver 23 sends initial data Tx1 at time t1, shown in FIG. 3(*a*). At time t1 which, for example, is during time Ti1, the first transmitter/receiver 1 stays off. Thus, some of the transmission data Tx1 is not received by the first transmitter/receiver 1. Subsequently, at time t2 after time Ti1 counted by the first transmitter/receiver 1, shown in FIG. 3(*b*), the first transmitter/receiver 1 is put in a data awaiting mode, and can receive the rest of the transmitted data. Still, the first transmitter/receiver 1 cannot establish synchronization and therefore cannot reproduce the data because the first transmitter/receiver 1 has received only some of the transmitted data, and thus remains in a data awaiting mode.

Thereafter, at time t3 shown in FIG. 3(*a*), the second transmitter/receiver 23 sends next transmission data Tx2. The transmission data Tx2 is received by the first transmitter/receiver 1 via the antenna 2 from the beginning of the data. The received spread spectrum data is subjected to frequency conversion, and then spread spectrum demodulation. Transmission data in an initial state contains a pilot carrier, and an information data such as ID (identification) data and control data. As described later, a pilot carrier is necessary for making a spread code on the receiver side be synchronized with the received data. Control data is necessary to control calling, data arrival, making a call, and other operations. As pilot carrier period is set long enough for the receiver to establish synchronization with respect to the received spread signal, the first transmitter/receiver 1 can establish synchronization for spread codes within a period for receiving the pilot carrier contained in the transmission data Tx2 from the second transmitter/receiver 23. When synchronization is established, the information data is subjected to digital demodulation into demodulated data. Then, control data is extracted from the demodulated data in the TDD controller 8 and supplied to the microcomputer 21.

At the time of data transmission, the TDD controller 8 of the second transmitter/receiver 23 resets the built-in timer simultaneously when the second transmitter/receiver 23 starts sending transmission data Tx2, and starts counting time Ti3. On the other hand, the TDD controller 8 of the first transmitter/receiver 1 resets the incorporated timer upon receipt of the transmission data Tx2, and starts counting time Ti3.

The microcomputer 21 of the first transmitter/receiver 1 detects, for example, ID data in the control data to see whether or not the detected ID data coincides with its own ID data. If they coincide, the microcomputer 21 outputs the relevant control data to the TDD controller 8. The first transmitter/receiver 1 then enters in a data transmission mode, after time Ti3 has elapsed as counted by the TDD controllers 8 in the first and second transmitter/receivers 1, 23, or time t4 shown in FIGS. 3(a) and 3(b) and after detecting coincidence of the ID data at the first transmitter receiver 1. Then, after carrying out spread spectrum modulation on the control data, the first transmitter/receiver 1 sends transmission data Ty which includes a pilot carrier and a communication carrier, via the antenna 2, as shown in FIG. 3(b). Simultaneously, the built-in timer to the TDD controller 8 of the first transmitter/receiver 1 is reset.

On the other hand, after the incorporated timer has counted time Ti3 from time t3, the second transmitter/receiver 23 is put in a data receiving mode so as to be capable of receiving transmission data Ty from the first transmitter/receiver 1. Upon receipt of the transmission data Ty, the built-in timer is reset. After carrying out spread spectrum demodulation to the transmitted data, the second transmitter/receiver 23 extracts ID data from the transmission data to confirm that the detected ID data coincides with its own ID data. If they coincide, the second transmitter/receiver 23 remains in a data receiving mode.

When the first and second transmitter/receivers 1 and 23 are each locked to transmission data from the other side in the initial synchronization state, the spread spectrum receiving frequency of one transmitter/receiver can be made coincident with the spread spectrum transmission frequency of the other transmitter/receiver. As a result, spread spectrum transmission/receiving frequencies can be matched with each other highly accurately between transmitter/receivers. Also, time can be managed accurately between the first and second transmitter/receivers 1 and 23.

Here, the data awaiting time Ti2 of the first transmitter/receiver 1 is set three times as long as the data transmission time or the data receiving time Ti3 in the initial synchronization state. Provide that the second transmitter/receiver 23 in the initial synchronization state ends data, as shown in FIG. 3(a). When the data awaiting time of the first transmitter/receiver 1 starts earlier than time t1, as shown in FIG. 3(e), the first transmitter/receiver 1 can be synchronized with the initial transmission data Tx1. On the other hand, when the time starts later than time t1, as shown in FIG. 3(f), the first transmitter/receiver 1 can not be synchronized with the initial transmission data Tx1 as the first transmitter/receiver 1 is put in a data awaiting mode only half way during the transmission of the initial transmission data Tx1. However, the first transmitter/receiver 1 can be synchronized with the second transmission data Tx2 which is sent during the data awaiting time from the second transmitter/receiver 23, similar to the case shown in FIG. 3(b), and thus can be fully received by the first transmitter/receiver 1.

That is, when the data awaiting time Ti2 is set to three times as long as the data transmission/receiving time in the initial synchronization state so that at least one data transmission time is included in the data awaiting time, transmission data can be reliably received.

Note that although the data awaiting time Ti2 is set three times as long as the data transmission time or a data receiving time Ti3 in the initial synchronization state in the above, it is not limited thereto as long as it is set so as to always include transmission data. For example, the time Ti2 may be set twice as long or as the data transmission/receiving time in the initial synchronization state.

Figure 4:
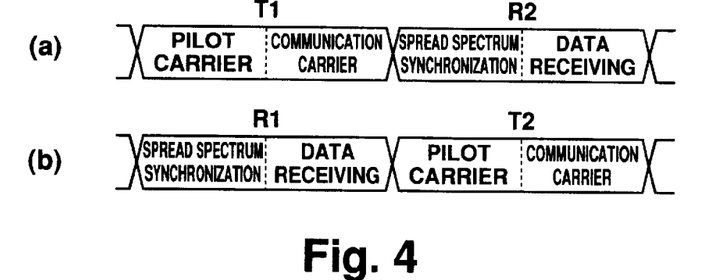
FIG. 4 is a diagram showing data structure in a normal receiving state.

After the second transmitter/receiver 23 confirms coincidence of the ID data and time Ti 3 is then counted over by the first and second transmitter/receivers 1 and 23, the first and second transmitter/receivers 1 and 23 are both put in a normal receiving state at time t5, shown in FIGS. 3(a) and 3(b). Further, at time t5, the TDD controller 8 causes the first transmitter/receiver 1 to be in a data receiving mode R1, and a means for generating a spread code incorporated into the spread spectrum demodulator 6 is reset to generate a spread code for use in spread spectrum demodulation. The second transmitter/receiver 23, on the other hand, is put in a transmission mode to send data T1, and resets a spread code for use in spread spectrum modulation. That is, when the first and second transmitter/receivers 1 and 23 simultaneously reset spread codes, as described above, the patterns of spread codes become substantially coincident between the first and second transmitter/receivers 1 and 23, which can reduce a time before synchronization is established for spread spectrum. Data T1 or other data to be transmitted in a normal receiving state comprises, as shown in FIG. 4(a), a pilot carrier and a communication carrier. In particular, a communication carrier includes an ID signal and audio data for communication.

The second transmitter/receiver 23 sends data T1, and the first transmitter/receiver 1 receives the data T1. The transmission data T1 contains, as shown in FIG. 4(a), a pilot carrier and a communication carrier. The first transmitter/receiver 1 receives dummy data during a pilot carrier period, so that the spread spectrum demodulator 6 establishes synchronization based on the received dummy data using a sliding correlation device and thereafter maintains the synchronization. However, as described above, it generally takes time, when using a sliding correlation device, to complete the operation for synchronization establishment. In this view, according to this embodiment, a part of the transmission data, e.g., dummy data "0, 1, 0, 1 . . . " is replaced by data for spread spectrum, and dummy data is sent during a pilot carrier period. Using the dummy data in the spread spectrum transmission data, the receiver establishes synchronization for the transmission data within the pilot carrier period. Since synchronization can be established during a pilot carrier period, the communication data which is contained as information data in a communication carrier can be subjected to spread spectrum modulation from the beginning of the communication carrier period with the synchronization maintained. Note that a pilot carrier period is set long enough so that a sliding correlation device which usually takes time to establish synchronization can complete the operation for establishing synchronization within the pilot carrier. Also note that the dummy data is not limited to the above-mentioned pattern, and may have various other patterns, such as "0, 0, 1, 1 . . . " and "0, 0, 0, 1, 1, 1 . . . ".

Therefore, according to this embodiment, during the pilot carrier period for the transmission data T1, as shown in FIG. 4(a), the first transmitter/receiver resultantly stays in a spread spectrum synchronization establishment period, as shown in FIG. 4(b). Thereafter, when the spread spectrum demodulator 6 starts an operation for holding the synchronization, a communication carrier period starts, in which transmission data received by the first transmitter/receiver 1 is subjected to the spread spectrum modulation, and then separated into control data and audio data in the TDD controller 8. The control data is supplied to the microcomputer 21, while the audio data is decoded and then converted into an analog audio signal.

During the above operation, the TTD controllers 8 of the first and second transmitter/receivers 1 and 23 count time Ti4 from time t5. At time t6, data transmission/receiving modes are reversed in the first and second transmitter/receivers 1 and 23. That is, the first transmitter/receiver 1 in a data awaiting mode is put in a data transmission mode, while the second transmitter/receiver 23 in a data transmission mode is put in a data awaiting mode. Also at time t6, the spread spectrum modulator 17 of the first transmitter/receiver 1 and the spread spectrum demodulator of the second transmitter/receiver 23 reset generation of spread codes.

Also at time t6, shown in FIGS. 3(a) and 3(b), the TDD controller 8 of the first transmitter/receiver 1 generates repetitive data of "0" and "1", which is then subjected to spread spectrum modulation in the spread spectrum modulator 17 whereby dummy data is generated. The first transmitter/receiver 1 sends the dummy data to the second transmitter/receiver 23 during a pilot carrier period, shown in FIG. 4(a). When the pilot carrier period ends after a predetermined time, the TDD controller 8 of the first transmitter/receiver 1 mixes control data supplied from the microcomputer 21 and encoded audio data to output the mixed data to the spread spectrum modulator 17. The spread spectrum modulator 17 carries out spread spectrum modulation on the mixed data, so that the first transmitter/receiver 1 sends the resultant data as transmission data T2 during a communication carrier period.

With the first transmitter/receiver 1 sending data, the second transmitter/receiver 23 establishes spread spectrum synchronization during the pilot carrier period, and receives transmission data including predetermined information data and demodulates and decodes audio or control data during the communication carrier period. After time Ti4 has elapsed after time t6, i.e., time t7, data transmission/receiving modes are reversed in the first and second transmitter/receivers 1 and 23. In the normal receiving state, the first and second transmitter/receivers 1 and 23 repeatedly receive and transmit data in response to a TDD.

Here, note that a pilot carrier period in a normal receiving state is set according to a time until spread spectrum synchronization is established. Since a means for generating a spread code is reset both on the transmitter and receiver sides when an operation for synchronization establishment is started in the normal receiving state, spread code series may continue in substantially the same patterns on the transmitter and receiver sides. As it is, spread codes can be synchronized in a relatively short time between the first and second transmitter/receivers 1 and 23. On the other hand, as with transmission data Tx (Tx1, Tx2) and Ty in the initial synchronization state, which are also made of combined pilot and communication carriers, as shown in FIG. 4, the data period is set longer than a data transmission/receiving time Ti4 in the normal receiving state. Specifically, referring to the timing chart of FIG. 3, time Ti3, for example, is set twice as long as time Ti4. In the initial synchronization state, the first transmitter/receiver 1 may take a longer time to establish synchronization than in a normal receiving state because the pattern of the spread code contained in the transmission data Tx2 does not coincide with the pattern of the spread code of the first transmitter/receiver 1 when the first transmitter/receiver 1 starts an operation for establishing spread spectrum synchronization at time t3 shown in FIG. 3(b). To cope with this situation, the pilot carrier period in the initial synchronization state is set longer than that in the normal receiving state so that spread spectrum synchronization can be reliably established in the initial synchronization state. As a result, a communication carrier following the pilot carrier can be accurately demodulated. Note that either the pilot carrier period only or both of the pilot carrier period and the communication carrier period in the initial synchronization state may be set longer than in a normal receiving state.

FIGS. 3(c) and 3(d) show a timing chart for a case where the first transmitter/receiver 1 sends initial transmission data Ty to the second transmitter/receiver 23 in the initial synchronization state. The first transmitter/receiver 1 sends transmission data Ty at time t8, shown in FIG. 3(d), and the second transmitter/receiver 23, which stays in a data awaiting mode, receives the transmitted data as received data Ry, as shown in FIG. 3(c). The second transmitter/receiver 23 then carries out frequency conversion with the spread spectrum received signal, and then spread spectrum demodulation. After spread spectrum synchronization is established, the second transmitter/receiver 23 detects, for example, ID data for confirmation. In the case that the received ID data coincides with its own ID data, the transmission/receiving states of the first and second transmitter/receivers 1 and 23 are reversed after time Ti3 passed, i.e., at time t9, so that the second transmitter/receiver 23 in turn sends transmission data Tx. The first transmitter/receiver 1 then detects ID data from the transmission data to see whether or not the received ID data coincides with its own ID data. After a predetermined time Ti 3 has elapsed, i.e., at time t10, the first and second transmitter/receivers 1 and 23 both become in a normal receiving state, as shown in FIGS. 3(a) and 3(b).

As described above, also in the case that initial transmission data is sent by the first transmitter/receiver 1, mutual ID data can be confirmed and the spread spectrum transmission/receiving frequencies can be made highly accurately coincident between the transmitter and the receiver. Also, by setting a longer pilot carrier period in the initial synchronization state than in the normal receiving state, spread spectrum synchronization can be established within the pilot carrier period in the initial synchronization state.

Figure 5A:
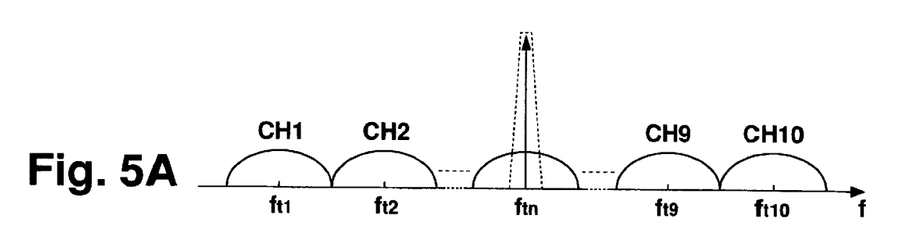
FIGS. 5A and 5B are diagrams showing characteristics of channels for each frequency.
Figure 5B:
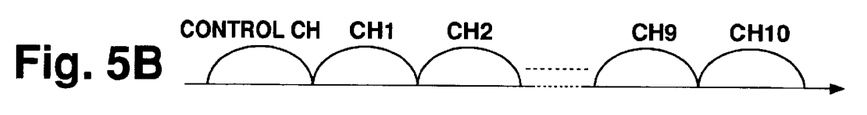

Referring to FIG. 2, the first and second transmitter/receivers 1 and 23 use a plurality of, e.g., ten, channels for data transmission and receiving, as shown in FIGS. 5A and 5B. In the first transmitter/receiver 1, local oscillation signals of the frequency synchronizer 4 are changed so as to accord to the respective channels under control of the microcomputer 21 whereby transmission and receiving RF frequencies ftn of the transmitter/receiver are changed. Specifically, the microcomputer 21 controls the frequency synchronizer 4 such that transmission and receiving RF frequencies are set at ft1 to use channel CH1, or at ft9 to use channel CH9. These transmission and receiving RF frequencies ftn are similarly changed in the second transmitter/receiver 23. Note that the changes of transmission and receiving RF frequencies ftn are made in synchronism between the first and second transmitter/receivers 1 and 23.

Here, there may be a case where the spread spectrum system, as shown in FIG. 2, and a system which employs any other modulation/demodulation methods, such as SSB (Single Side Band) modulation/demodulation method, for use in a narrow band may commonly use the same frequency band adapted to various modulation methods. In that case, data may not be normally transmitted or received via channel CHn in the spread spectrum system because a narrow band modulation signal has a higher level than a spread spectrum signal, as shown in FIG. 5A. To avoid this situation, it is desired to detect, through a search, whether or not the channel intended to be used is an empty channel before starting data transmission.

Referring to FIG. 2, an output signal from the receiving mixer 5 is subjected to level detection in the narrow band level detector 22. At the time of detection, the narrow band level detector 22, which has a narrow frequency band as indicated by the dotted line in FIG. 5A, detects the level of a signal only in the narrow band indicated by the arrow in the drawing. The detected signal is then compared with a reference voltage Vref. In the case that a narrow band signal is present in the selected channel, the detected signal a derived from the narrow band level detection signal is applied to the microcomputer 21 as the detected signal level is higher than the reference voltage Vref. In the case that a narrow band signal is not present, on the other hand, a detection signal a is not generated.

When it is known from the detected signal a that the selected channel is not an empty channel, an empty channel must be looked for to be used instead of the selected channel as follows. One method is to provide a control channel, besides channels CH1 to CH10 for data transmission, as shown in FIG. 5B. Then, a plurality of paired transmitter/receivers remain in a data awaiting mode ready to receive data via the control channel. Here, provide that one transmitter/receiver is ready to send data, that transmitter/receiver conducts a search with respect to channels CH1 to CH10 to look for empty channels. Initially, the transmitter/receiver selects CH1. Staying in a data receiving state, the transmitter/receiver judges, referring to an output level of the narrow band level detector, whether or not CH1 is an empty channel. When the output level is lower than a predetermined level, CH1 is judged and registered as an empty channel. If the output level is higher, CH1 is judged as not an empty channel and the above process is repeated with respect to other channels until an empty channel is found. When some empty channels are found, the transmitter/receiver sends, via the control channel, transmission data including channel information of one empty channel which the transmitter/receiver intends to use and ID data. In response to the transmission data, another transmitter/receiver among many of the transmitter/receivers, whose ID data coincides with the transmitted ID data, is put in an initial synchronization state and receives the initial transmission data. Referring to the transmission data, the transmitter/receiver checks the channel information on the empty channel in the initial synchronization state, and, after the initial synchronization, changes the channels based on the received channel information. When the change of channels is completed, the transmitter/receiver is put in a normal receiving state.

Alternatively, transmission via an empty channel can also be achieved in the following method. That is, a pair of transmitter/receivers having the same ID data detect, when being in a data awaiting mode, whether or not the currently used channel is an empty channel while exchanging data in a normal transmission operation. The detection is made while referring to a detection signal outputted from a narrow band level detector. In the case where a narrow band signal is present in the selected channel, both of the paired transmitter/receivers detect a narrow band signal. Thereafter, the paired transmitter/receivers change the transmission and receiving RF frequencies such that a different channel is selected in a predetermined procedure. When changing of channels is completed, initial synchronization and detection of an empty channel will again be carried on with respect to the new channel. If the channel is detected to be an empty channel, the paired transmitter/receivers become in a normal receiving state for data transmission.

As described above, when a spread spectrum signal and a narrow band signal coexist, an empty channel can be automatically detected so that the involved transmitter/receivers shift to using the detected empty channel.

Note that although the first transmitter/receiver 1 is a handset of a cordless telephone device and the second transmitter/receiver 23 is a central station (an extension telephone) in the above, they are not limited thereto. For example, the first transmitter/receiver 1 may be a central station and the second transmitter/receiver 23 may be a handset. Alternatively, the present invention shown in FIG. 2 can be applied to a moving station and a base station of a radio transmitter/receiver.

What is claimed is:

1. A bi-directional transmission/receiving system for time division communicating a signal in two directions between first and second transmitter/receivers, the signal being modulated using a spread spectrum method, the system comprising:

a first transmitter/receiver and a second transmitter/receivers;

a transmitting transmitter/receiver of said first and second transmitter/receivers transmits transmission data containing a pilot carrier and a communication carrier that follows said pilot carrier and transmits the transmission data in a transmission period during an initial synchronization state, which is the until synchronization between said first and second transmitter/receivers that are not synchronized is established;

said pilot carrier contains synchronization data for allowing a receiving transmitter/receiver of said first and second transmitter/receivers to establish synchronization of transmission spread spectrum signal; and said communication carrier contains communication data having information data, wherein the transmission data is exchanged between the first and second transmitter/receivers, the first and second transmitter/receivers shift from being in the initial synchronization state in which the first and second transmitter/receivers are not synchronized to being in a normal receiving state in which the first and second transmitter/receivers are communicating spread spectrum signals, and the pilot carrier is kept being sent in the initial synchronization state for a longer time than in the normal receiving state.

2. A bi-directional transmission/receiving system for time division communicating a signal in two directions between first and second transmitter/receivers, the signal being modulated using a spread spectrum method, the system comprising:

a first transmitter/receiver and a second transmitter/receiver;

a transmitting transmitter/receiver of said first and second transmitter/receivers transmits transmissions data containing a pilot carrier and a communication carrier that follows said pilot carrier and transmits the transmission data in a transmission period during an initial synchronization state, which is the state until synchronization between said first and second transmitter/receivers that are not synchronized is established;

said pilot carrier contains synchronization data for allowing a receiving transmitter/receiver of said first and second transmitter receivers to establish synchronization of transmission spread spectrum signal; and said communication carrier contains communication data having information data, wherein the first and second transmitter/receivers each have a number of channels usable for communication, and at least one of the first and second transmitter/receivers detects, through a search, an empty channel from among the number of channels either in advance or while being in a data transmission/receiving mode so that the empty channel detected is used for data transmission/receiving.

3. A bi-directional transmission/receiving system for time division communicating a signal in two directions between first and second transmitter/receivers, the signal being modulated using a spread spectrum method, the system comprising:

a first transmitter/receiver and a second transmitter/receiver;

a transmitting transmitter/receiver of said first and second transmitter/receivers transmits transmission data containing a pilot carrier and a communication carrier that follows said pilot carrier and transmits the transmission data in a transmission period during an initial synchronization state, which is the state until synchronization between said first and second transmitter/receivers that are not synchronized is established;

said pilot carrier contains synchronization data for allowing a receiving transmitter/receiver of said first and second transmitter receivers to establish synchronization of transmission spread spectrum signal; and said communication carrier contains communication data having information date, wherein the first and second transmitter/receiver of the first and second receiving transmitter/receivers starts counting a predetermined time upon starting sending data to the transmitter/receiver of the first and second transmitter/receivers, the receiving transmitter/receiver of the first and second transmitter/receiver also starts counting a time of a same length as the predetermined time upon starting receiving the data, and the first and second transmitter/receivers both reverse transmission/receiving states after the predetermined time has elapsed.

4. A transmitter/receiver for time division communicating a signal in two directions with a paired transmitter/receiver, the signal being modulated using a spread spectrum method, the transmitter/receiver comprising:

a transmitter/receiver transmits transmission data to the paired transmitter/receiver, the transmission data containing a pilot carrier and a communication carrier that follows said pilot carrier;

the transmitter/receiver transmits the transmission data in a transmission period during an initial synchronization state, which is the state until synchronization between the transmitter/receiver and the paired transmitter/receiver that are not synchronized is established;

said pilot carrier contains synchronization data for allowing the paired transmitter/receiver to establish synchronization of transmission spread spectrum signal; and said communication carrier contains communication data having information data, wherein the transmitter/receiver shifts from being in an initial synchronization state in which the transmitter/receiver is not synchronized with the paired transmitter/receiver to being in a normal receiving state in which the transmitter/receiver communicates spread spectrum signals with the paired transmitter/receiver, the data which the transmitter/receiver sends to the paired transmitter/receivers in the initial synchronization state and the normal receiving state includes the pilot carrier and the communication carrier, and the pilot carrier is kept being sent in the initial synchronization state for a longer time than in the normal receiving state.

5. A transmitter/receiver system according to claim 1, wherein the receiving transmitter/receiver of the first and second transmitter/receivers stays in a data awaiting period in an intermittent receiving state for a longer time than in a data transmission period in the initial synchronization state.

6. A transmitter/receiver system according to claim 4, wherein the paired transmitter/receiver stays in a data awaiting period in an intermittent receiving stat for a longer time than in a data transmission period in the initial synchronization state.

* * * * *